(12) United States Patent
Freche et al.

(10) Patent No.: US 11,182,182 B2
(45) Date of Patent: Nov. 23, 2021

(54) CALLING ARBITRARY FUNCTIONS IN THE KERNEL VIA A PROBE SCRIPT

(71) Applicant: VMware, Inc., Palo Alto, CA (US)

(72) Inventors: Julien Freche, Mountain View, CA (US); Ashish Kaila, Cupertino, CA (US); Lorenzo David, Redwood City, CA (US); Abhishek Srivastava, Sunnyvale, CA (US); Nahim El Atmani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/521,380

(22) Filed: Jul. 24, 2019

(65) Prior Publication Data
US 2021/0026669 A1 Jan. 28, 2021

(51) Int. Cl.
*G06F 9/455* (2018.01)
*G06F 11/36* (2006.01)
*G06F 8/41* (2018.01)

(52) U.S. Cl.
CPC ............ *G06F 9/45529* (2013.01); *G06F 8/41* (2013.01); *G06F 9/45533* (2013.01); *G06F 11/362* (2013.01)

(58) Field of Classification Search
None
See application file for complete search history.

(56) References Cited

U.S. PATENT DOCUMENTS

| | | | | |
|---|---|---|---|---|
| 7,971,255 B1* | 6/2011 | Kc | ......................... | G06F 21/566 726/24 |
| 8,032,899 B2* | 10/2011 | Archer | .................. | G06F 9/5077 719/319 |
| 8,910,155 B1* | 12/2014 | Sobel | .................. | G06F 9/45558 718/1 |
| 9,471,552 B1* | 10/2016 | Kolam | .................. | G06F 16/957 |
| 2004/0098707 A1* | 5/2004 | Tang | .................... | G06F 11/3624 717/130 |
| 2008/0222659 A1* | 9/2008 | Brumme | ............. | G06F 9/45537 719/320 |
| 2009/0249300 A1* | 10/2009 | Vainer | ................. | G06F 11/3476 717/127 |
| 2018/0081776 A1* | 3/2018 | Brown | ................... | G06F 11/263 |
| 2019/0087210 A1* | 3/2019 | Dowling | ............. | G06F 9/30174 |
| 2021/0026669 A1* | 1/2021 | Freche | ................. | G06F 11/3636 |

OTHER PUBLICATIONS

Barry, "Wrapper Function: Operating system overview", 2012, Science Direct (Year: 2012).*

(Continued)

*Primary Examiner* — Hossain M Morshed
(74) *Attorney, Agent, or Firm* — Kim & Stewart LLP (57) ABSTRACT

A method of probing a computer system includes steps of compiling a script that includes a call to a first function with first parameters, to generate executable code that includes a call to a second function with second parameters, wherein the second function and the second parameters are specified as values of the first parameters of the first function in the call to the first function, injecting the executable code into an executing module of the computer system, and as the executing module is running, executing the executable code to call the second function.

19 Claims, 7 Drawing Sheets

(56) References Cited

OTHER PUBLICATIONS

Syscall, Linux Programmer's Manual, Linux/Unix system programming training, published at https://man7.org/linux/man-pages/man2/syscall.2.html (Year: 2018).*
Ramaswamy, Katana: A Hot Patching Framework for ELF Executables, 2010, IEEE (Year: 2010).*
Chriserin, Pass arguments through to wrapped function, 2018, Hashrock, at https://til.hashrocket.com/posts/mkwp6yxaxt-pass-arguments-through-to-wrapped-function (Year: 2018).*
Gompel, "Wrapper script", 2018, Published at https://clam.readthedocs.io/en/latest/wrapperscript.html (Year: 2018).*
Chriserin, "Pass arguments through to wrapped function", 2018, https://til.hashrocket.com/posts/mkwp6yxaxt-pass-arguments-through-to-wrap (Year: 2018).*
Carbone et al., "VProbes: Deep Observability Into the ESXi Hypervisor", VMTJ Summer 2014, VMware Technical Journal, 2014, pp. 1-8.
VMware, Inc., "VMware VProbes User Guide", vSphere 5.1, Workstation, and Fusion, 2011, pp. 1-122.

\* cited by examiner

```
#define VPROBE_CALLFUNC_MAX_ARGS 6                          ← Step 202
typedef VProbeInt (*VProbeTargetFunction)(VProbeInt arg0,
    VProbeInt arg1,
    VProbeInt arg2,                                          Step 204
    VProbeInt arg3,
    VProbeInt arg4,
    VProbeInt arg5);
static VProbeInt VProbeBuiltinCallFunction(int numArgs, VProbeInt *arg) {
    VProbeInt funcArgs[VPROBE_CALLFUNC_MAX_ARGS] = {0};
    VProbeTargetFunction func;
    VProbeInt rip, ret;
    char *fmt;
    int i;

rip = getFunctionAddrFromName(1, &arg[1]);               ← Steps 210 & 220
    func = (VProbeTargetFunction)rip;                        ← Step 222

// The function has a format specifier only when it also has arguments
    if (numArgs > 2) {                                       ← Step 224
        for (i = 0; i < VPROBE_CALLFUNC_MAX_ARGS && fmt[i] != 0; ++i) {
            switch (fmt[i]) {
                case 'd':
                    funcArgs[i] = arg[3 + i];                Steps 230
                    break;                                   and 240
                case 's':
                    VProbeExec_GetValidStr(arg[3 + i], (char **)&funcArgs[i],
                        "callfunction");
                    break;
            }
        }
    }                                                        Steps 250 & 260
    ret = func(funcArgs[0], funcArgs[1], funcArgs[2], funcArgs[3], funcArgs[4],
        funcArgs[5]);

return ret;                                              ← Step 270
}
```

```
void main() {
  int ret;

// Unit test for foo
  ret = callfunction("foo", "d", 41);            ◄─────────── Steps 308-314
  assert(ret == 42, "Test failure %d != 42", ret);   ◄─── Steps 316-320

// Unit test for bar
  ret = callfunction("bar", "d", 21);            ◄─────────── Steps 308-314
  assert(ret == 0, "Test failure %d != 0", ret);    ◄─── Steps 316-320
}
```

CALLING ARBITRARY FUNCTIONS IN THE KERNEL VIA A PROBE SCRIPT

BACKGROUND

A code probing technology, known as VProbes, has been developed by VMware, Inc. of Palo Alto, Calif., to enable an administrator to instrument software modules of virtualized computer systems. VProbes runs by executing probe scripts, which contain code in a scripting language known as Emmett. Details of VProbes and the Emmett scripting language are described in the "VMware VProbes User Guide," which is available from VMware, Inc. and is incorporated by reference herein.

A kernel of system software is a computer program that provides various core functionalities to system software, e.g., translating input/output (I/O) requests from the system software into data-processing instructions for a processor. An administrator can use VProbes to inject code into a running kernel and observe the behavior of kernel functions at run-time. However, a probe script cannot directly call a kernel function. A probe script can only specify what the kernel should do if the kernel calls that function. As such, an administrator cannot use VProbes to unit test kernel functions without the administrator writing code for testing modules. Additionally, there are start-up functions that a kernel only calls when the kernel starts up. If a kernel has already called a start-up function and will not call the function again, then the administrator must restart the kernel to observe the execution of that function.

SUMMARY

A probe script according to one or more embodiments forces a kernel to execute a kernel function by implementing a trampoline function that calls the kernel function. In the probe script, the trampoline function accepts information about the kernel function as parameters to the trampoline function. Then, VProbes injects the probe script into the kernel and the trampoline function calls the kernel function. Any kernel function can be called by the trampoline function as long as the probe script provides the trampoline function with the necessary parameters to identify the kernel function and call the function with parameters require by the kernel function.

A method of probing a computer system includes steps of compiling a script that includes a call to a first function with first parameters, to generate executable code that includes a call to a second function with second parameters, wherein the second function and the second parameters are specified as values of the first parameters of the first function in the call to the first function, injecting the executable code into an executing module of the computer system, and as the executing module is running, executing the executable code to call the second function.

Further embodiments of the present invention include, without limitation, a non-transitory computer readable storage medium that includes instructions that enable a computer system to implement one or more aspects of the above methods as well as a computer system configured to implement one or more aspects of the above methods.

DETAILED DESCRIPTION

Figure 1:
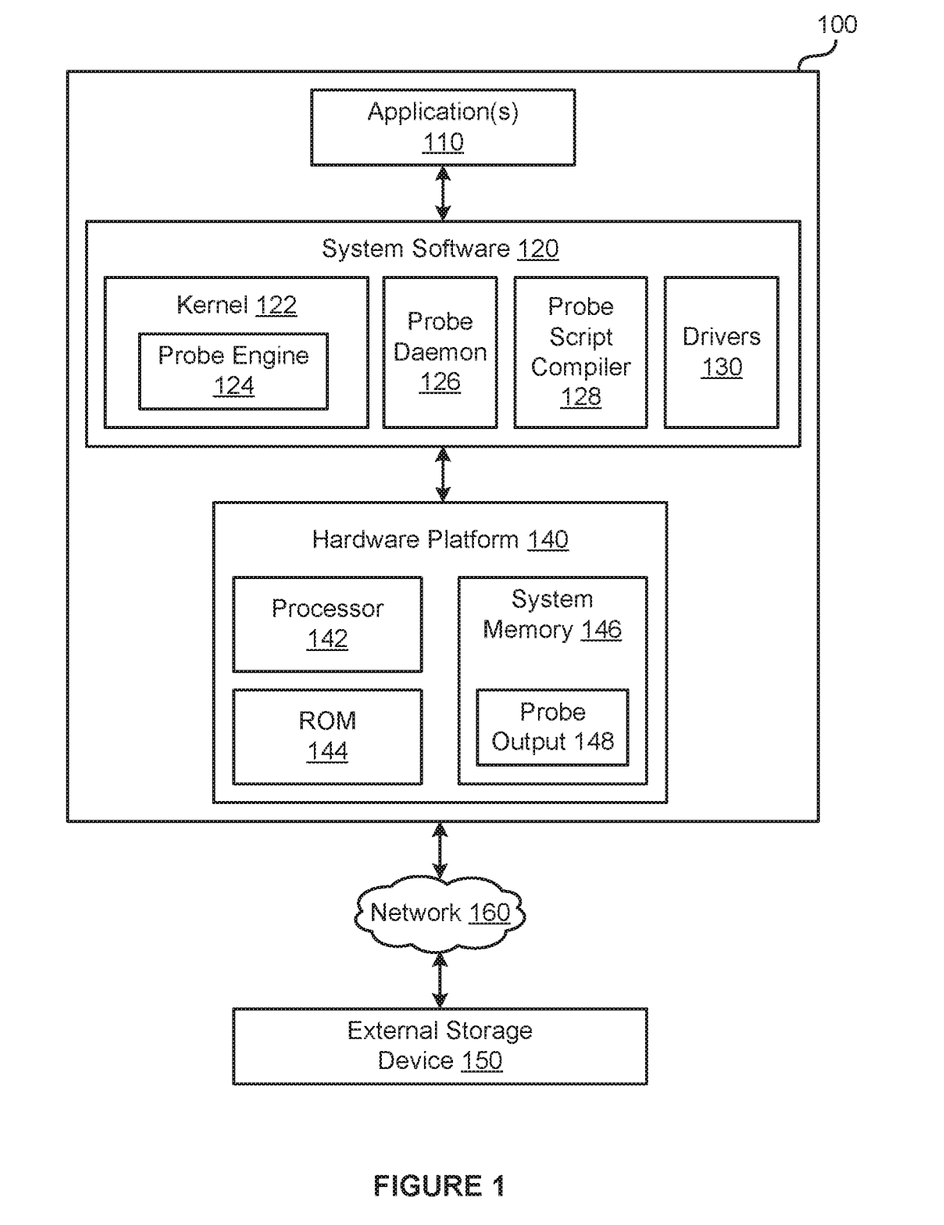
FIG. 1 is a block diagram of a computer system in which one or more embodiments may be implemented.

FIG. 1 is a block diagram of a computer system 100 in which one or more embodiments may be implemented. Computer system 100 includes one or more applications 110 that run on top of system software 120. In one embodiment, system software 120 is an operating system (OS). In another embodiment, e.g. where applications 110 are virtual machines (VMs), system software 120 is a hypervisor that supports VM applications. The hypervisor may be the VMware vSphere® Hypervisor, which is commercially available from VMware, Inc.

System software 120 comprises a plurality of software modules, including a kernel 122 that manages hardware resources provided by hardware platform 140 through various drivers 130. Other components of system software 120, i.e., probe engine 124, probe daemon 126, and probe script compiler 128, will be described below.

Hardware platform 140 comprises conventional components of a computer system, including a processor 142, read-only memory (ROM) 144, and system memory 146 with a data buffer 148 for storing probe script outputs. Processor 142 may include one or more central processing units (CPUs). Computer system 100 also comprises an external storage device 150 that is accessible over a network 160. External storage device 150 may be implemented as a storage area network (SAN) device or as a network-attached storage (NAS) device. Additionally, storage device 150 may be configured as a storage device that is shared with one or more other computer systems. In another embodiment, hardware platform 140 comprises a local storage device, e.g., a hard disk drive (HDD), solid-state drive (SSD), or hybrid drive containing both rotating disks and non-volatile semiconductor memory.

Probe daemon 126 functions as an I/O communication interface to a management console (not shown). In the embodiments illustrated herein, a user tests, debugs, or patches a kernel function by loading a probe script into the management console. The management console sends the probe script to probe daemon 126. Probe daemon 126 sends the probe script to probe script compiler 128 to perform initial compilation of the probe script into byte code. During this initial compilation, probe script compiler 128 inserts runtime checks for code that could cause kernel 122 to hang or crash, e.g., infinite loops and bad pointers. The Emmett compiler referenced in the VMware VProbes User Guide may be used as probe script compiler 128.

Probe script compiler 128 sends the byte code back to probe daemon 126. If there are no errors in the probe script, probe daemon 126 sends the byte code into probe engine 124 to perform compilation of the byte code into executable binary code. Probe engine 124 then executes the binary code to perform the instructions of the probe script. The VP engine referenced in the VMware VProbes User Guide may be used as probe engine 124. Probe engine 124 physically stores any output generated by the probe script in data buffer 148. Probe daemon 126 streams any probe script output from data buffer 148 to the management console for analysis by an administrator.

A probe script may define one or more probes that instrument a software module of system software 120. A probe specifies a domain that the probe targets, a body of code that the probe executes, and a trigger. The domain that is of interest in the embodiments described herein is the kernel 122. Other domains are described in the VMware VProbes User Guide. The trigger is an event of interest in the targeted domain, e.g., a kernel function execution or periodic timer tick. When a probe detects its trigger, the probe executes its body of code. The body of code includes a call to a kernel function. In the invention disclosed herein, a probe script also executes a kernel function without creating a probe. In this case, kernel 122 executes the specified kernel function without a trigger. Various data types may be defined for the output generated by probes, including strings, aggregates, and bags. These data types are further described in the VMware VProbes User Guide.

Figure 2A:
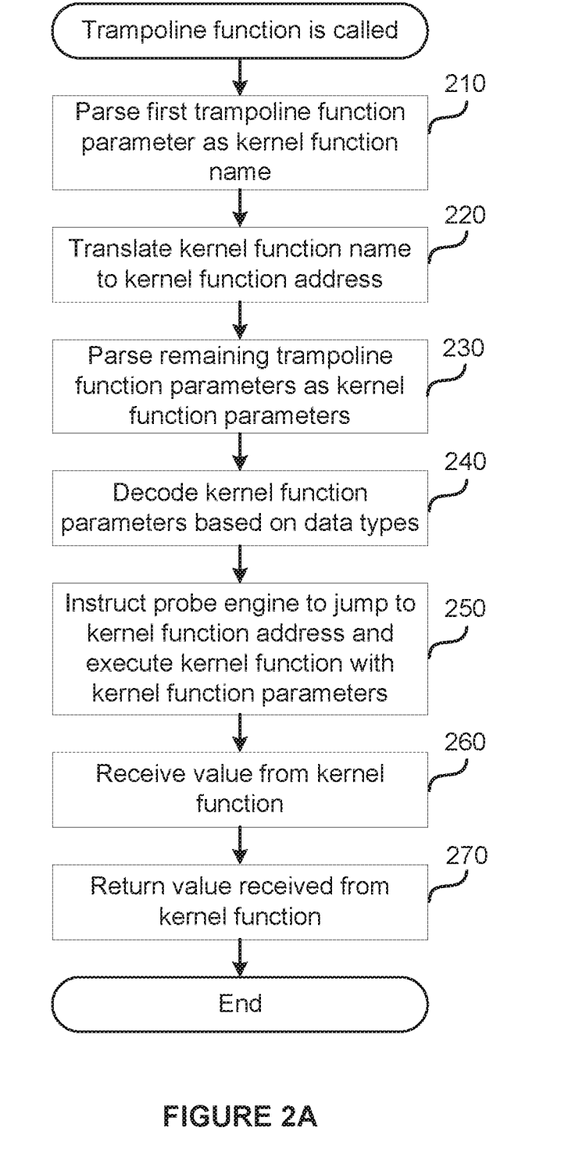
FIG. 2A is a flow diagram that illustrates steps carried out by a trampoline function to call a kernel function according to an embodiment.

FIG. 2A is a flow diagram that illustrates steps carried out by a trampoline function to call a kernel function according to an embodiment. In the embodiment illustrated herein, the kernel function is implemented in a probe scripting language as a trampoline function that probe scripts call. The trampoline function accepts the prototype for a kernel function as parameters. The prototype of a kernel function includes an identifier of the kernel function (e.g., the name of the kernel function as a string), arguments to pass to the kernel function, and data types of the parameters for the kernel function (e.g., the character 'd' denoting an integer-type parameter and the character 's' denoting a string-type parameter). The parameters that a probe script sends to the trampoline function will be referred to herein as trampoline function parameters. The parameters that the trampoline function passes to a kernel function will be referred to herein as kernel function parameters.

After the probe script calls the trampoline function, at step 210, the trampoline function parses the first trampoline function parameter as a kernel function name. At step 220, the trampoline function translates the name of the kernel function to the address of the kernel function in kernel 122.

At step 230, the trampoline function parses the remaining trampoline function parameters as parameters to pass to the kernel function. For each kernel function parameter, the trampoline function receives two trampoline function parameters: a data type and a value. For example, if the kernel function parameter is an integer-type value '41', the second trampoline function parameter will be the character 'd,' and the third trampoline function parameter will be the integer '41.' The probe script specifies any further kernel function parameters similarly. At step 240, the trampoline function uses the data types of the kernel function parameters to decode the values of the kernel function parameters.

At step 250, the trampoline function instructs probe engine 124 to jump to the kernel function address that was determined in step 220 and execute the kernel function. The trampoline function further sends each of the kernel function parameters as decoded in step 240. An administrator is thus able to use the trampoline function to force probe engine 124 to execute a specified kernel function with specified kernel function parameters. After the kernel function executes, at step 260, the trampoline function receives a return value from the kernel function. At step 270, the trampoline function returns the value received in step 260 to the probe script.

The trampoline function described herein decodes parameters with different data types. However, other implementations are possible in which a trampoline function does not perform such decoding. For example, separate trampoline functions may be implemented for calling kernel functions that only accept integer-type parameters, for calling kernel functions that accept only string-type parameters, etc. The trampoline function described herein also calls kernel functions of varying numbers of parameters. However, other implementations are possible. For example, separate trampoline functions may be implemented for calling kernel functions that accept only one parameter, for calling kernel functions that accept only two parameters, etc. Finally, the trampoline function described herein accepts a single return value from a kernel function. However, the trampoline function may be rewritten to accept multiple return values from a kernel function.

Figure 2B:
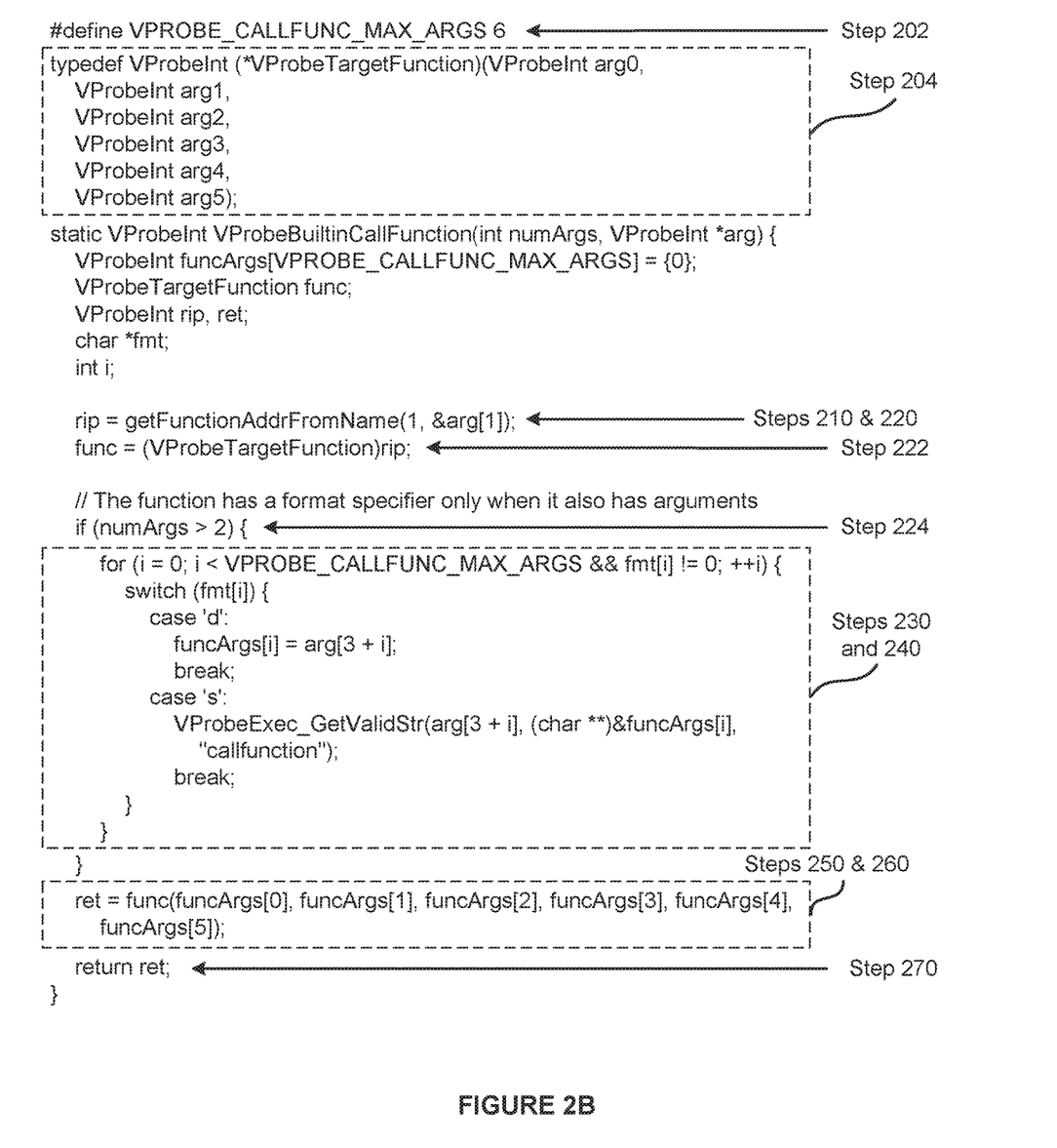
FIG. 2B is sample code for the trampoline function that is executed to call a kernel function.

FIG. 2B is sample code for the trampoline function that is executed to call a kernel function. At step 202, the code uses a macro to define the maximum number of kernel function parameters. The macro in this example sets the maximum number as six. At step 204, the code uses a type definition, typedef, to create an alias name for a new data type. Here, data of the new data type stores a prototype of a kernel function, including a value for the name of the kernel function, and values and data types for the kernel function parameters. As previously explained for FIG. 2A, the trampoline function accepts prototypes for functions of varying numbers of parameters. In this example, the new data type supports storing up to six parameters. However, for example, when the trampoline function calls a kernel function that only accepts five kernel function parameters, probe script compiler 128 ignores the value of 'arg5.'

At steps 210 and 220, as explained for FIG. 2A, the trampoline function parses the first trampoline function parameter as the name of a kernel function and translates the name of the kernel function to the address of the kernel function in kernel 122. The code here accomplishes this by searching a database within kernel 122 and assigning the resulting address to the variable 'rip.' At step 222, the trampoline function type casts the address of the kernel function to an actual function and assigns the actual function to the variable 'func.' The trampoline function later uses 'func' to jump to the address of the kernel function.

At step 224, the trampoline function determines if the probe script specified any kernel function parameters in the trampoline function parameters. As previously stated, the first trampoline function parameter is the name of a kernel function. Additionally, for each kernel function parameter, a probe script specifies two separate trampoline function parameters: a kernel parameter data type and a kernel parameter value. For example, the probe script may include the string 'foo' as a first trampoline function parameter, the character 'd' as a second trampoline function parameter and the integer '41' as a third trampoline function parameter. The trampoline function then determines that it will call the kernel function 'foo' with the integer-type value '41' as a kernel function parameter.

At steps 230 and 240, the trampoline function parses each of the remaining trampoline function parameters as kernel function parameters. Then, the trampoline function uses the specified data types of the kernel function parameters to decode the values of the kernel function parameters. At steps 250 and 260, as explained for FIG. 2A, the trampoline function instructs probe engine 124 to execute the kernel function and the trampoline function receives a return value from the kernel function. The trampoline function stores the return value in the variable 'ret.' At step 270, as explained for FIG. 2A, the trampoline function returns the return value stored in 'ret' to the probe script.

Figure 3A:
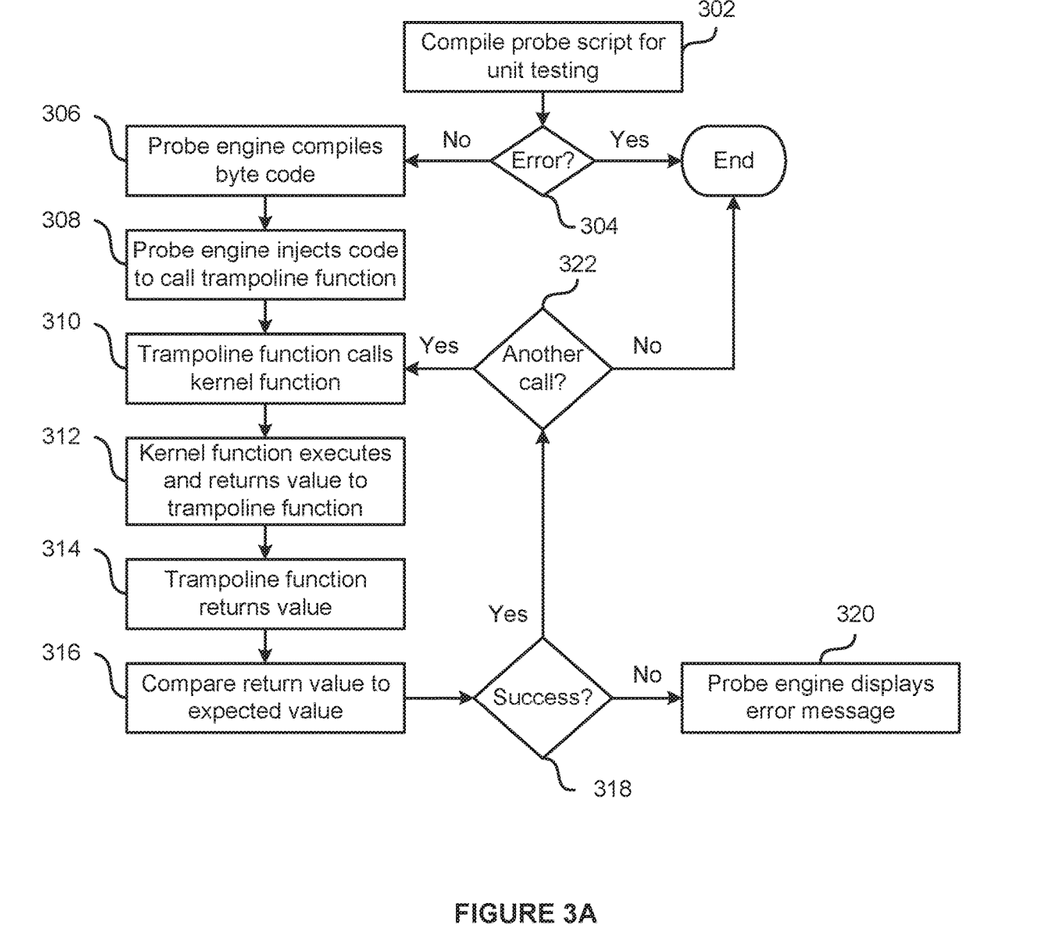
FIG. 3A is a flow diagram that illustrates a method of unit testing a kernel function according to an embodiment.

FIG. 3A is a flow diagram that illustrates a method of unit testing a kernel function according to an embodiment. In the embodiment illustrated herein, an administrator unit tests the kernel function by executing the kernel function directly within kernel 122.

At step 302, probe script compiler 128 compiles a probe script for unit testing into byte code. The probe script includes one call to the trampoline function (by which the kernel function is called). The probe script also includes code that compares a value received from the trampoline function to at least one expected value specified by the administrator. A value received from the trampoline function will be referred to herein as a trampoline function return value. A value specified by the administrator will be referred to herein as an expected value. An expected value is a value that the administrator expects the kernel function to return given kernel function parameters specified by the administrator.

At step 304, probe script compiler 128 inserts runtime checks for code that could cause hanging or crashing. If there are errors in the probe script, then then the method finishes, and the unit test is not completed. If there are no errors in the probe script, then probe script compiler 128 sends the byte code to probe engine 124 and the method moves to step 306.

At step 306, probe engine 124 compiles the byte code into executable binary code. At step 308, probe engine 124 injects the binary code into kernel 122 and kernel 122 calls the trampoline function. At step 310, the trampoline function calls the kernel function with any kernel function parameters included in the trampoline function parameters. At step 312, kernel 122 executes the kernel function with the specified kernel function parameters. After the kernel function executes, the kernel function sends a return value to the trampoline function. At step 314 the trampoline function returns the value received in step 312 to data buffer 148. At step 316, processor 142 compares the trampoline function return value to an expected value.

At step 318, processor 142 determines if the unit test is successful based on the comparison between the trampoline function return value and the expected value. For example, the probe script may comprise instructions to check if the trampoline function return value is equal to the expected value. If the two values are not equal, then the unit test is not successful. If the two values are equal, then the unit test is successful. If the unit test is not successful, then the method moves to step 320. At step 320, probe daemon streams an error message to a management console for analysis by the administrator. The error message comprises the trampoline function return value and words indicating that the unit test is not successful.

If the unit test is successful at step 318, then the method moves to step 322. At step 322, if the probe script contains another call to the trampoline function, then the method moves back to step 310. For example, the probe script may contain another call if the administrator wishes to check different outputs from the kernel function given different kernel function parameters. If the probe script does not comprise another call to the trampoline function, then the method finishes.

Figure 3B:
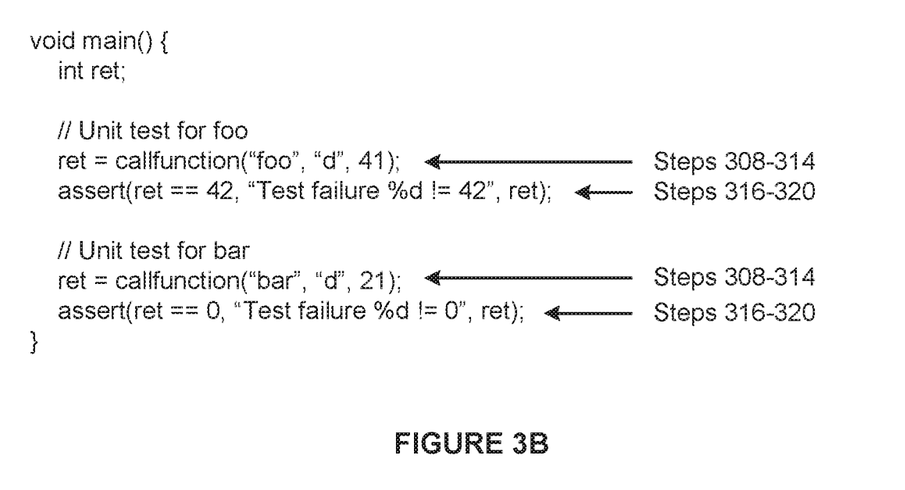
FIG. 3B is a sample probe script for unit testing kernel functions.

FIG. 3B is a sample probe script for unit testing kernel functions. The sample probe script comprises two calls to the trampoline function, a first call for unit testing a kernel function 'foo' and a second call for unit testing a kernel function 'bar.' At steps 308-314, as explained for FIG. 3A, kernel 122 calls the trampoline function, the trampoline function calls a kernel function, the kernel function executes and returns a value to the trampoline function, and the trampoline function returns the received value from the kernel function.

In each call to the trampoline function, the probe script includes three trampoline function parameters. In the unit test for 'foo,' the first trampoline function parameter specifies the name of the kernel function 'foo.' In the unit test for 'bar,' the first trampoline function parameter specifies the name of the kernel function 'bar.' The second trampoline function parameter specifies the data type for a first kernel function parameter. In each unit test, the data type for the first kernel function parameter is 'd,' which signifies the integer data type. The third trampoline function parameter specifies the value for the first kernel function parameter. In the unit test for 'foo,' the value for the first kernel function parameter is '41.' In the unit test for 'bar,' the value for the first kernel function parameter is '21.' Probe engine 124 thus injects code into kernel 122 for the trampoline function to call the kernel function 'foo' with the integer-type parameter '41' and to call the kernel function 'bar' with the integer-type parameter '21.' In each unit test, after executing the trampoline function, the probe script stores the trampoline function return value in the variable 'ret.'

At steps 316-320, as explained for FIG. 3A, processor 142 compares a trampoline function return value to an expected value. In the unit test for 'foo,' the expected value is '42.' The comparison in the unit test for 'foo' ultimately tests if the 'foo' kernel function returns a value of '42' when given the value '41' as a kernel function parameter. If the trampoline function does return the expected value of '42,' then the unit test for 'foo' is successful. However, if the trampoline function does not return the expected value of '42,' then the unit test for 'foo' is not successful. In the latter case, probe engine 124 displays an error message to an administrator. In the unit test for 'bar,' the expected value is '0.' The comparison in the unit test for 'bar' ultimately tests if the 'bar' kernel function returns a value of '0' when given the value '21' as a kernel function parameter. If the trampoline function does return the expected value of '0,' then the unit test for 'bar' is successful. However, if the trampoline function does not return the expected value of '0,' then the unit test for 'bar' is not successful. In the latter case, probe engine 124 displays an error message to the administrator.

In this sample code, the probe script comprises two calls to the trampoline function for unit testing two kernel functions. However, in other embodiments, a probe script may comprise only a single call to the trampoline function or may comprise more than two calls to the trampoline function. Further, in other embodiments, a probe script may unit test only a single kernel function or may unit test more than two kernel functions.

Figure 4:
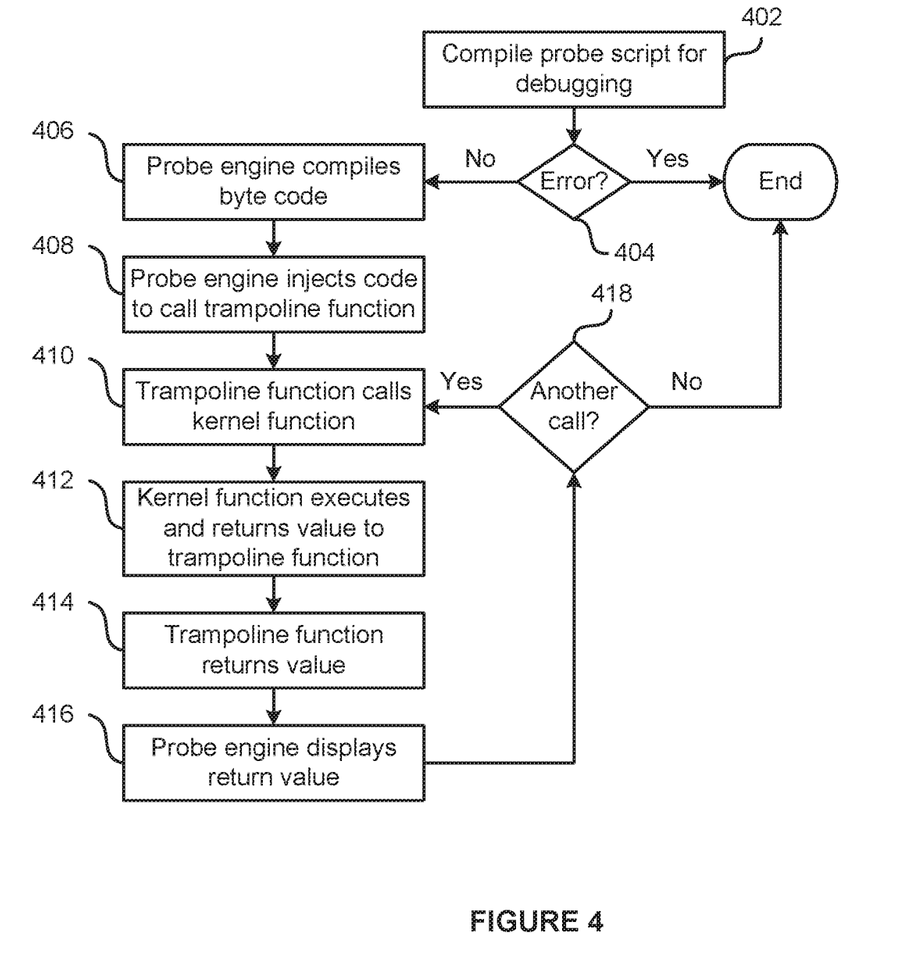
FIG. 4 is a flow diagram that illustrates a method of debugging a kernel according to an embodiment.

FIG. 4 is a flow diagram that illustrates a method of debugging a kernel according to an embodiment. In the embodiment illustrated herein, an administrator uses this method to execute a kernel function after kernel 122 enters an error state. The probe script then prints the output of the kernel function in order for the administrator to diagnoses why kernel 122 entered an error state.

At step 402, probe script compiler 128 compiles a probe script for debugging into byte code. The probe script comprises at least one call to the trampoline function. The probe script also comprises code that prints a trampoline function return value to the administrator for diagnosing kernel 122.

The method of FIG. 4 performs steps 404-414 similarly to how the method of FIG. 3A performs steps 304-314. At step 404, probe script compiler 128 inserts runtime checks for code that could cause hanging or crashing. If there are errors in the probe script, then then the method finishes, and the debugging is not completed. If there are no errors in the probe script, then probe script compiler 128 sends the byte code to probe engine 124 and the method moves to step 406. At step 406, probe engine 124 compiles the byte code into executable binary code. At step 408, probe engine 124 injects the binary code into kernel 122 and kernel 122 calls the trampoline function. At step 410, the trampoline function calls the kernel function with any kernel function parameters included in the trampoline function parameters. At step 412, kernel 122 executes the kernel function with the specified kernel function parameters. After the kernel function executes, the kernel function sends a return value to the trampoline function. At step 414 the trampoline function returns the value received in step 412 to data buffer 148.

At step 416, probe engine 124 displays the return value stored in data buffer 148 to a management console. The administrator uses the displayed return value to diagnose what caused kernel 122 to enter an error state. At step 418, if the probe script contains another call to the trampoline function, then the method moves back to step 410. For example, the probe script may contain another call if the administrator checks outputs from multiple kernel functions to debug kernel 122. If the probe script does not comprise another call to the trampoline function, then the method finishes.

Figure 5:
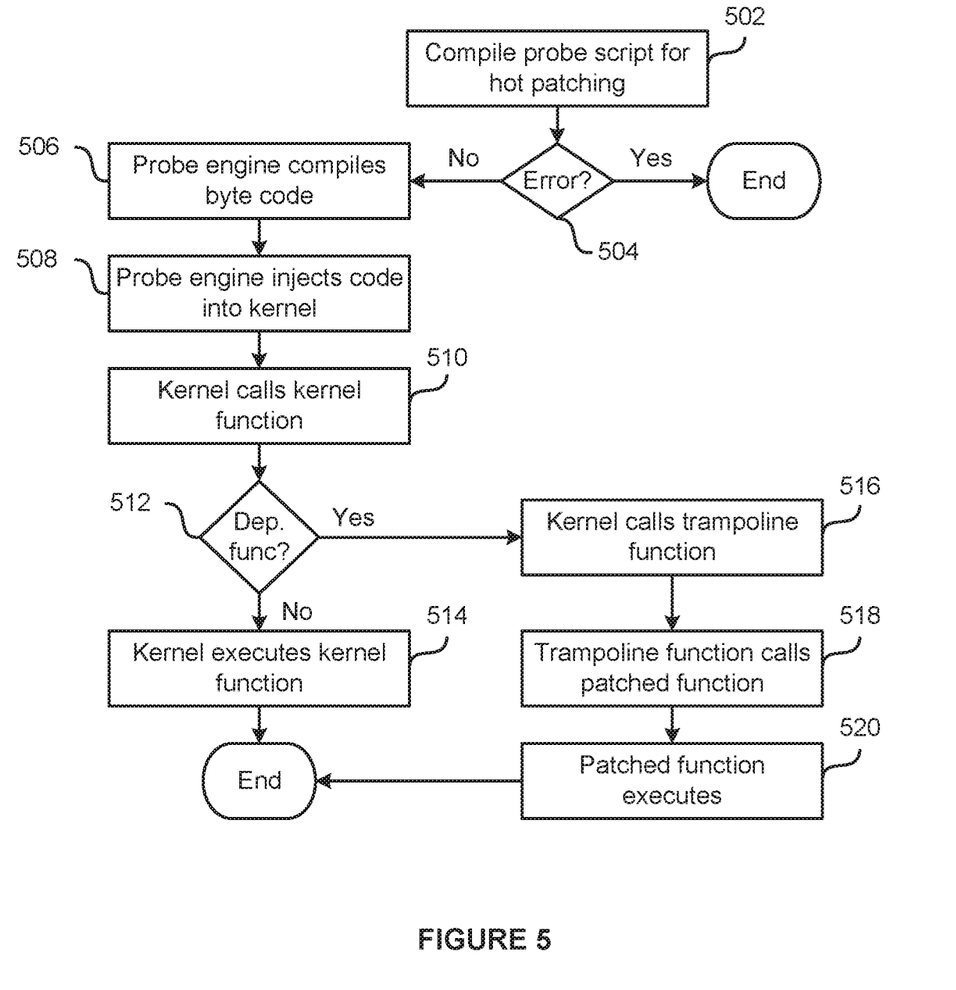
FIG. 5 is a flow diagram that illustrates a method of hot patching a kernel according to an embodiment.

FIG. 5 is a flow diagram that illustrates a method of hot patching a kernel according to an embodiment. In the embodiment illustrated herein, an administrator uses this method to replace a call to a first kernel function with a call to a second kernel function. The first kernel function will be referred to in herein as the deprecated function and the second kernel function will be referred to herein as the patched function. In one example, the deprecated function contains a bug that the administrator is aware of Kernel 122 can avoid the bug by calling the patched function in place of the deprecated function. The administrator thus uses VProbes to force kernel 122 to skip any later executions of the deprecated function and to execute the patched function instead.

At step 502, probe script compiler 128 compiles a probe script for hot patching into byte code. The probe script comprises a probe in which the trigger is entry into the deprecated function. The body of the probe includes a call to the trampoline function, the call comprising the name of the patched function as a first trampoline function parameter.

The method of FIG. 5 performs steps 504-506 similarly to how the method of FIG. 3A performs steps 304-306. At step 504, probe script compiler 128 inserts runtime checks for code that could cause hanging or crashing. If there are errors in the probe script, then then the method finishes, and the hot patching is not completed. If there are no errors in the probe script, then probe script compiler 128 sends the byte code to probe engine 124 and the method moves to step 506. At step 506, probe engine 124 compiles the byte code into executable binary code.

At step 508, probe engine 124 injects the binary code into kernel 122 that detects entry into the deprecated function and that calls the trampoline function when kernel 122 calls the deprecated function. At step 510, kernel 122 calls a kernel function at run-time. At step 512, kernel 122 determines whether or not the function called at step 510 is the deprecated function. If the function called at step 510 is the deprecated function, then the method moves to step 514. At step 514, kernel 122 executes the function called at step 510 and the method finishes. If the function called at step 510 is the deprecated function, then after step 512, the method moves to step 516.

At step 516, kernel 122 calls the trampoline function with any trampoline function parameters specified by the administrator. At step 518, the trampoline function calls the patched function with any kernel function parameters included in the trampoline function parameters. At step 520, kernel 122 executes the patched function and the method finishes.

The various embodiments described herein may employ various computer-implemented operations involving data stored in computer systems. For example, these operations may require manipulation of physical quantities. Usually, though not necessarily, these quantities may take the form of electrical or magnetic signals, where the signals or representations of the signals can be stored, transferred, combined, compared, or otherwise manipulated. Further, such manipulations are often referred to in terms such as producing, identifying, determining, or comparing. Any operations described herein that form part of one or more embodiments of the invention may be useful machine operations.

Additionally, one or more embodiments of the invention relate to a device or an apparatus for performing these operations. The apparatus may be specially constructed to perform the required operations. The apparatus may also be a general-purpose computer and a computer program stored in the computer may activate or configure the computer. Various general-purpose computers may be used with computer programs written in accordance with the teachings herein. The various embodiments described herein may also be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in one or more computer readable media. The term computer readable medium refers to any data storage device that can store data that can thereafter be input to a computer system. Computer readable media may be based on any existing or subsequently-developed technology for embodying computer programs that a computer reads. Examples of computer readable media include hard drives, NAS devices, ROM, random-access memory (RAM), compact disks (e.g., CD-ROMs, CD-Rs, CD-RWs, and DVDs), magnetic tapes, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive. The scope of the claims is not to be limited to the details given herein but may be modified within the scope and equivalents of the claims. In the claims, elements and steps do not imply any particular order of operation, unless explicitly stated in the claims.

Virtualization systems in accordance with the various embodiments may be implemented as hosted embodiments, non-hosted embodiments, or as embodiments that tend to blur distinctions between the two. Further, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest OS that performs virtualization functions. Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the invention.

Generally, structures and functionality that are presented as separate components in exemplary configurations may be implemented as a combined structure or component. Similarly, structures and functionality presented as a single component may be implemented as separate components. These and other variations, modifications, additions, and improvements may fall within the scope of the claims.

What is claimed is:

1. A method of probing a kernel executing in a computer system, comprising:
   receiving, from a management console at a probe daemon executing in the computer system, a script that includes a call to a trampoline function with first parameters, wherein first values of the first parameters specify a kernel function of the kernel, the kernel function having second parameters;
   compiling, by a script compiler executing in the computer system, the script as received from the probe daemon;
   compiling, by a probe engine of the kernel, byte code output by the script compiler to generate executable binary code;
   injecting, by the probe engine, the executable binary code into the kernel; and
   executing, by the kernel, the executable binary code to call the trampoline function, which in turn calls the kernel function with the second parameters.

2. The method of claim 1, wherein the computer system has virtual machines executing therein and the kernel is part of a hypervisor that supports execution of the virtual machines.

3. The method of claim 1, wherein the trampoline function is a generic function that is used to generate executable code for calling different functions depending on a value of one of the first parameters, the executable code calling the kernel function when the value of one of the first parameters specifies the kernel function, and a total number of the first parameters is greater than a total number of the second parameters.

4. The method of claim 3, further comprising:
   compiling, by the script compiler, a different script that includes a call to the trampoline function with the first parameters, wherein second values of the first parameters specify a call to a different kernel function of the kernel with third parameters;
   wherein the different kernel function is different from the kernel function and a total number of the third parameters is different from the total number of the second parameters.

5. The method of claim 1, further comprising:
   comparing a value returned in response to calling the kernel function against an expected value as a unit test for the kernel function.

6. The method of claim 1, wherein a value that is returned in response to calling the kernel function represents an output of the kernel function.

7. The method of claim 1, wherein the script includes a probe having a trigger and a body, the trigger being entry into a deprecated function of the kernel, the body including the call to the trampoline function, the kernel function being a patched kernel function, the method further comprising:
   calling, by the kernel, the deprecated kernel function;
   executing, by the kernel in response to the trigger of the probe, the executable binary code to replace the call to the deprecated kernel function with a call to the patched kernel function.

8. A non-transitory computer readable medium comprising instructions executed in a computer system to carry out a method of probing a kernel executing in the computer system, said method comprising:
   receiving, from a management console at a probe daemon executing in the computer system, a script that includes a call to a trampoline function with first parameters, wherein first values of the first parameters specify a kernel function of the kernel, the function having second parameters;
   compiling, by a script compiler executing in the computer system, the script as received from the probe daemon;
   compiling, by a probe engine of the kernel, byte code output by the script compiler to generate executable binary code;
   injecting, by the probe engine, the executable binary code into the kernel;
   executing, by the kernel, the executable binary code to call the trampoline function, which in turn calls the kernel function with the second parameters.

9. The non-transitory computer readable medium of claim 8, wherein the computer system has virtual machines executing therein and the kernel is part of a hypervisor that supports execution of the virtual machines.

10. The non-transitory computer readable medium of claim 8, wherein the trampoline function is a generic function that is used to generate executable code for calling different functions depending on a value of one of the first parameters, the executable code calling the kernel function of the kernel when the value of one of the first parameters specifies the kernel function of the kernel, and a total number of the first parameters is greater than a total number of the second parameters.

11. The non-transitory computer readable medium of claim 10, wherein said method further comprises:
   compiling, by the script compiler, a different script that includes a call to the trampoline function with the first parameters, wherein second values of the first parameters specify a call to a different kernel function of the kernel with third parameters;
   wherein the different kernel function is different from the kernel function and a total number of the third parameters is different from the total number of the second parameters.

12. The non-transitory computer readable medium of claim 8, wherein said method further comprises:
   comparing a value returned in response to calling the kernel function against an expected value as a unit test for the kernel function.

13. The non-transitory computer readable medium of claim 8,
wherein a value that is returned in response to calling the kernel function represents an output of the kernel function.

14. The non-transitory computer readable medium of claim 8, wherein the script includes a probe having a trigger and a body, the trigger being entry into a deprecated kernel function of the kernel, the body including the call to the trampoline function, the kernel function being a patched kernel function, the method further comprising:
calling, by the kernel, the deprecated kernel function;
executing, by the kernel in response to the trigger of the probe, the executable binary code to replace the call to the deprecated kernel function with a call to the patched kernel function.

15. A computer system, comprising:
a processor that is executing code for a hypervisor that is supporting execution of virtual machines, the hypervisor including a kernel; and
a memory, wherein the memory includes code which when executed by the processor performs the steps of:
receiving, from a management console at a probe daemon executing in the computer system, a script that includes a call to a trampoline function with first parameters, wherein first values of the first parameters specify a kernel function of the kernel, the kernel function having second parameters;
compiling, by a script compiler executing in the computer system, the script as received from the probe daemon;
compiling, by a probe engine of the kernel, byte code output by the script compiler to generate executable binary code;
injecting, by the probe engine, the executable binary code into the kernel; and
executing, by the kernel, the executable binary code to call the trampoline function, which in turn calls the kernel function with the second parameters.

16. The computer system of claim 15, wherein
the trampoline function is a generic function that is used to generate executable code for calling different functions depending on a value of one of the first parameters, the executable code calling the kernel function of the kernel when the value of one of the first parameters specifies the kernel function of the kernel, and a total number of the first parameters is greater than a total number of the second parameters.

17. The method of claim 1, further comprising:
storing, by the probe engine, output data generated by execution of the executable binary code in a data buffer; and
sending, by the probe daemon to the management console, the output data in the data buffer.

18. The non-transitory computer readable medium of claim 8, further comprising:
storing, by the probe engine, output data generated by execution of the executable binary code in a data buffer; and
sending, by the probe daemon to the management console, the output data in the data buffer.

19. The computer system of claim 15, wherein the code is executed by the processor to perform the steps of:
storing, by the probe engine, output data generated by execution of the executable binary code in a data buffer; and
sending, by the probe daemon to the management console, the output data in the data buffer.

\* \* \* \* \*